(12) United States Patent
Batten

(10) Patent No.: US 11,973,886 B2
(45) Date of Patent: Apr. 30, 2024

(54) SECURE COMMUNICATION SYSTEM AND SOFTWARE ARCHITECTURE FOR A DIGITAL LICENSE PLATE

(71) Applicant: ReviverMx, Inc., Granite Bay, CA (US)

(72) Inventor: Dean Batten, North Bend, WA (US)

(73) Assignee: ReviverMx, Inc., Granite Bay, CA (US)

(*) Notice: Subject to any disclaimer, the term of this patent is extended or adjusted under 35 U.S.C. 154(b) by 217 days.

(21) Appl. No.: 17/360,757

(22) Filed: Jun. 28, 2021

(65) Prior Publication Data

US 2021/0328815 A1  Oct. 21, 2021

Related U.S. Application Data

(63) Continuation of application No. 15/863,654, filed on Jan. 5, 2018, now abandoned.

(Continued)

(51) Int. Cl.
| | |
|---|---|
| *H04L 29/06* | (2006.01) |
| *G06F 21/57* | (2013.01) |
| *G06F 21/88* | (2013.01) |
| *H04L 9/00* | (2022.01) |
| *H04L 9/08* | (2006.01) |

(Continued)

(52) U.S. Cl.
CPC .......... *H04L 9/3268* (2013.01); *G06F 21/575* (2013.01); *G06F 21/88* (2013.01); *H04L 9/006* (2013.01); *H04L 9/0825* (2013.01); *H04L 9/30* (2013.01); *H04L 63/0428* (2013.01); *H04L 63/0442* (2013.01); *H04W 4/50* (2018.02); *H04W 12/04* (2013.01); *H04W 12/35* (2021.01); *H04L 67/01* (2022.05); *H04L 2209/80* (2013.01); *H04L 2209/84* (2013.01)

(58) Field of Classification Search
CPC ..... H04L 9/3268; H04L 9/006; H04L 9/0825; H04L 9/30; H04L 63/0442; H04L 67/01; H04L 2209/80; H04L 2209/84; G06F 21/575; H04W 12/04
See application file for complete search history.

(56) References Cited

U.S. PATENT DOCUMENTS

| | | | |
|---|---|---|---|
| 2004/0143737 A1* | 7/2004 | Teicher | G06K 7/1095 713/167 |
| 2013/0006775 A1* | 1/2013 | Jordan | G08G 1/20 705/14.62 |
| 2014/0237627 A1* | 8/2014 | Mylavarapu | H04L 9/0894 726/30 |

FOREIGN PATENT DOCUMENTS

CN 201503640 U * 6/2010

OTHER PUBLICATIONS

T. Pinthong, W. Yimyam, N. Chumuang and M. Ketcham, "License Plate Tracking Based on Template Matching Technique," 2018 18th International Symposium on Communications and Information Technologies (ISCIT), Bangkok, Thailand, 2018, pp. 299-303, doi: 10.1109/ISCIT.2018.8587992. (Year: 2018).*

* cited by examiner

*Primary Examiner* — Shawnchoy Rahman
(74) *Attorney, Agent, or Firm* — Innovent Law, PC.; Karima Gulick

(57) ABSTRACT

A digital license plate has a secure communication system able to initialize the digital license plate, support external communications, and have various antitheft features. In some embodiments, a communication module can transmit both vehicle identification number and digital license plate identifier to a central server. The central server is able to act in the event of a security mismatch to modify operation of the digital license plate.

20 Claims, 10 Drawing Sheets

Related U.S. Application Data

(60) Provisional application No. 62/442,780, filed on Jan. 5, 2017, provisional application No. 62/442,777, filed on Jan. 5, 2017.

(51) Int. Cl.
| | |
|---|---|
| *H04L 9/30* | (2006.01) |
| *H04L 9/32* | (2006.01) |
| *H04L 9/40* | (2022.01) |
| *H04W 4/50* | (2018.01) |
| *H04W 12/04* | (2021.01) |
| *H04W 12/30* | (2021.01) |
| *H04L 67/01* | (2022.01) |

SECURE COMMUNICATION SYSTEM AND SOFTWARE ARCHITECTURE FOR A DIGITAL LICENSE PLATE

RELATED APPLICATIONS

This application is a continuation of U.S. application Ser. No. 15/863,654, filed Jan. 5, 2018; which claims the benefit of U.S. Provisional Application Ser. No. 62/442,777, filed Jan. 5, 2017 and U.S. Provisional Application Ser. No. 62/442,780, filed Jan. 5, 2017. The applications are incorporated herein by reference for all purposes.

TECHNICAL FIELD

The present disclosure relates to vehicle mounted exterior displays, and more specifically to a digital license plate having a secure communication system able to initialize the digital license plate, support external communications, and have various antitheft features.

BACKGROUND

One potential apparatus for creating, storing, processing, and communicating vehicle data is available in conjunction with dynamic display that presents vehicle identification and registration information and can be arranged on the exterior of a vehicle. For example, U.S. Pat. No. 9,007,193, and pending published US Patent application US20130006775, both assigned to ReviverMX, describe a dynamic display that improves updateability of vehicle identification and registration information by use of a digital license plate using communication system.

However, such digital license plates should be able to be securely enabled, with an accurate license number associated with digital license plate and the vehicle. Further, any later changes, updates, or data transfers need to be verified by a server acting in combination with a security system on or attached to the vehicle. Such dynamic displays could in addition benefit from security and software architecture that would prevent or limit ability of thieves or computer intrusion agents from reprogramming a digital license plate number, background, messaging, or advertising.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
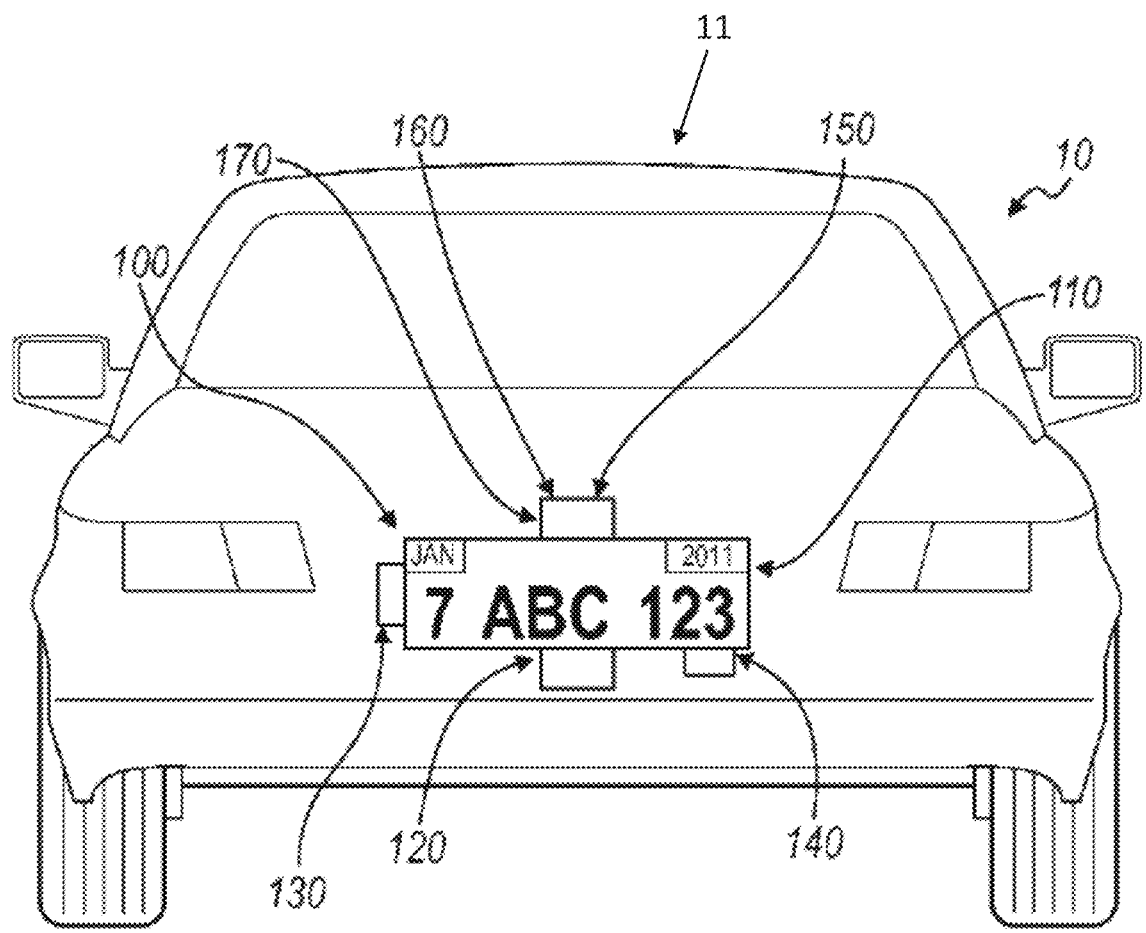
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10 includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
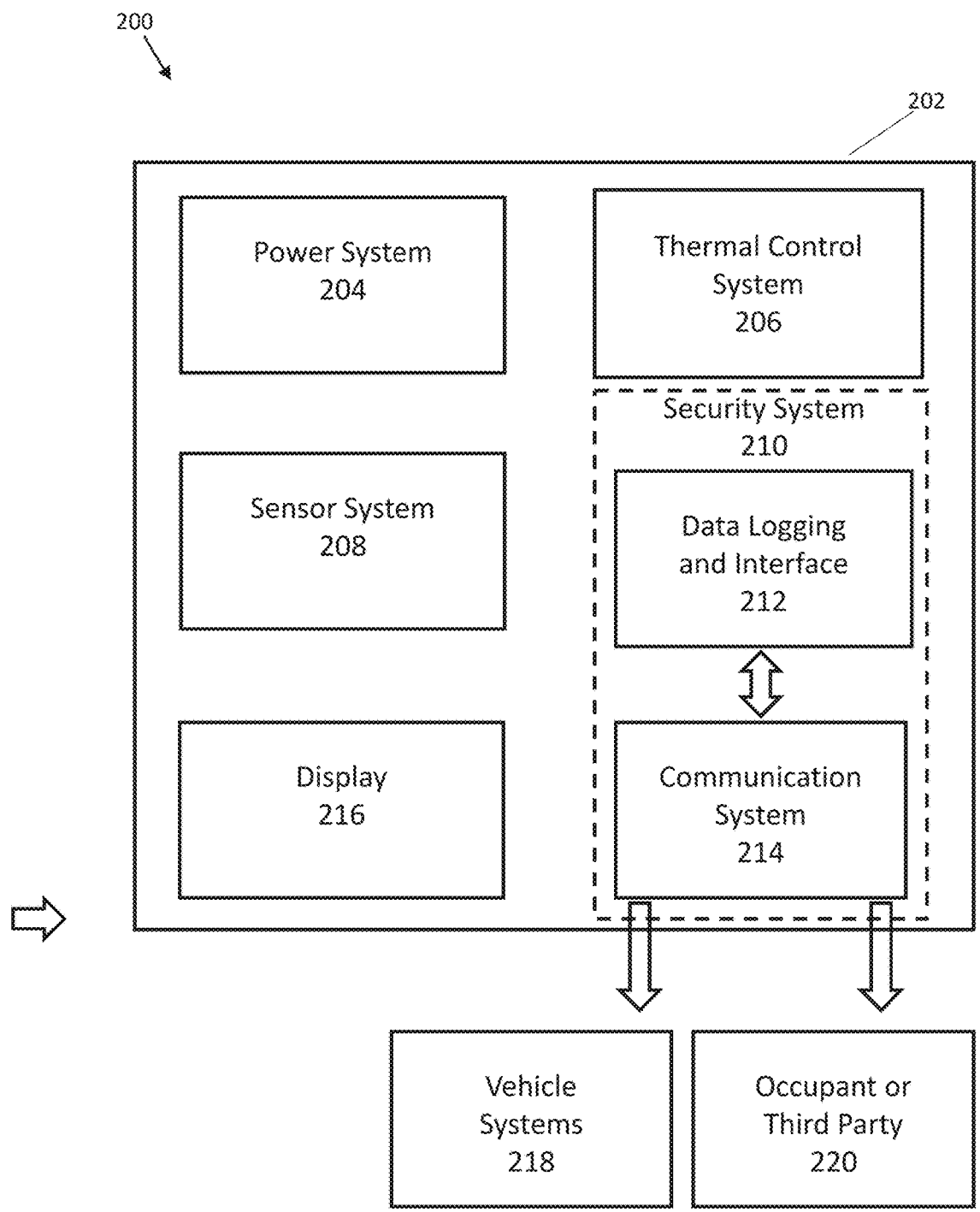
FIG. 2 illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
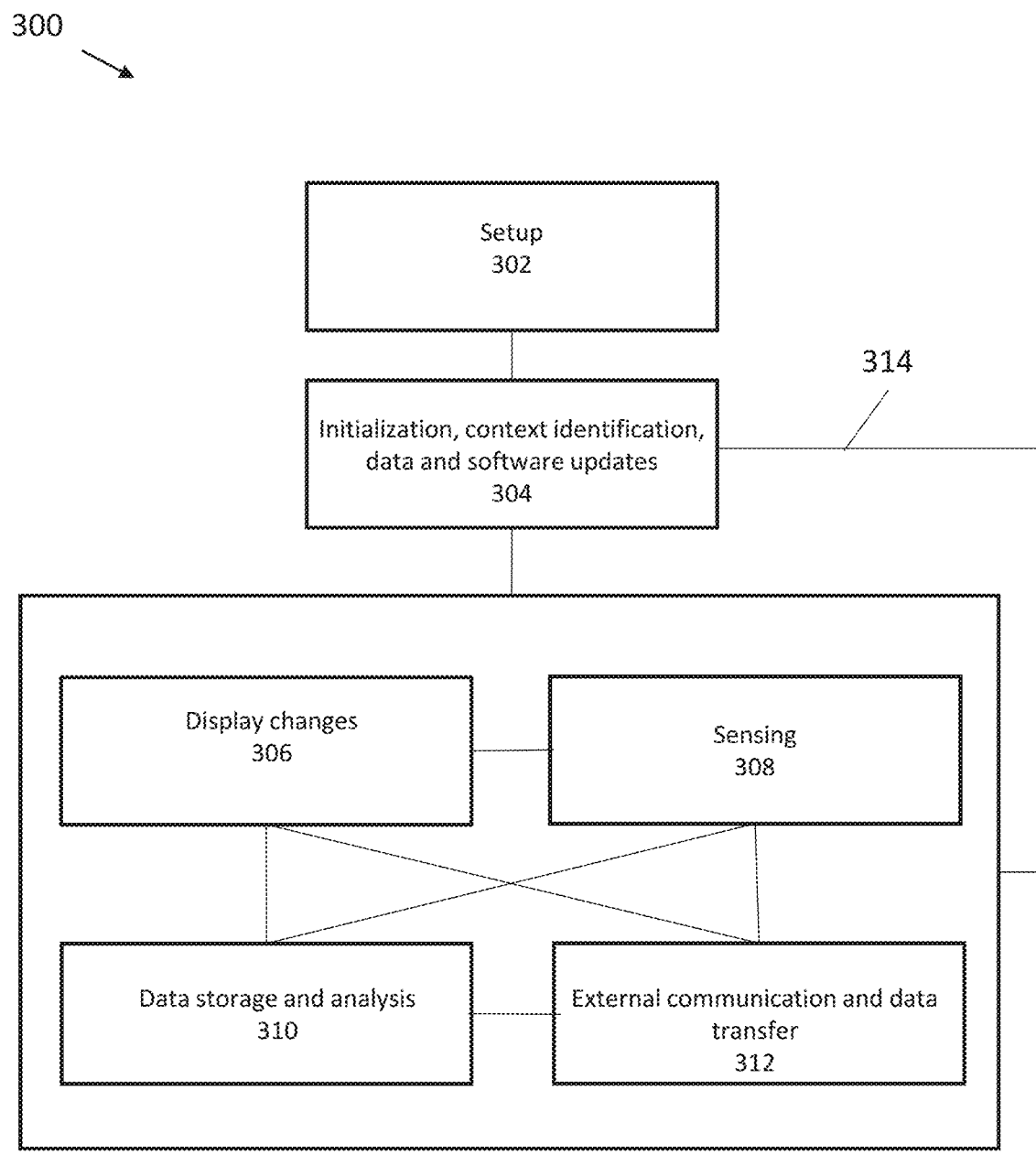
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4:
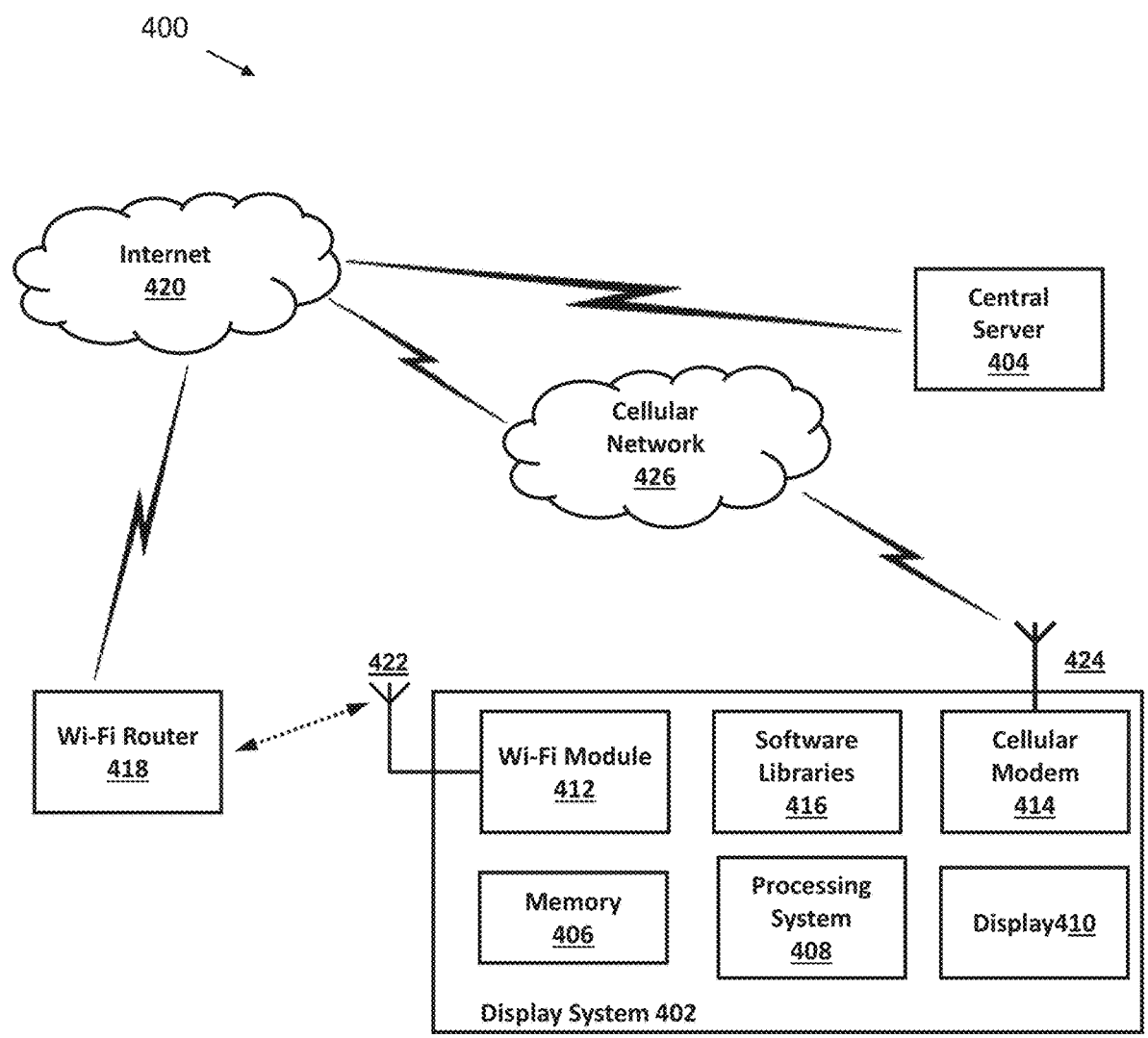
FIG. 4 is a diagram illustrating communication schemes.

FIG. 4 is a diagram illustrating communication schemes associated with a digital system 402. In some embodiments, display system 402 includes a processing system 408, a display 410, and a memory module 406. Processing system 408 is configured to perform, for example, data processing operations associated with display system 402. Memory module 406 may be configured to store temporary or long-term data. Display 410 may be configured to display the information content presented in the foregoing description. Display system 402 may also include a cellular modem 414 and an associated cellular antenna 424. Cellular modem 414 is configured to make a connection to the internet 420 via a cellular network 426. Display system may include an operating system that includes a software libraries module 416, where software libraries module 416 is configured to allow applications running on display system 402 to communicate to the internet 420 via cellular network 426. The low-level communication with the cellular network is handled by the baseband processor (not shown) inside cellular modem 414. Layered on top of that are the internet protocols that manage the data connection with the internet 420. These are managed by the code libraries that are supplied as part of the installed operating system. This operating system also provides an interface that allows applications to communicate with these libraries and by doing so they are able to send and receive data over the network.

Display system 402 also has a Wi-Fi module 412 coupled to a Wi-Fi antenna 422 that allows it to utilize a Wi-Fi network generated by a Wi-Fi router 418 as an alternate way to connect to the internet 420. As in the cellular case, there are software libraries running on the processing system 408 that interact with and control the Wi-Fi module 412 and that allow applications to utilize the Wi-Fi network to pass data to and from the internet 420. There is a central server 404 that is remote from display system 402 that is connected to the internet 420, enabling display system 402 to address and communicate with it via standard internet protocols.

Display system 402 communicates with central server 404 to obtain configuration information and to download assets. The application running on central server 404 is called the "plate service," and is interacted with via a representational state transfer (RESTful) interface. All traffic between the any number of display systems such as display system 402 and the plate service is encrypted using industry-standard SSL/TLS protocols. In addition, the display systems and central server 404 verify each other's identities by checking that they are each presenting a valid x.509 SSL certificate. In the case of the central server 404, this SSL certificate is signed by a valid public certificate authority (CA) tied to a root certificate that is recognized by the plate. Display system certificates, also known as client certificates, are self-signed by a CA owned or controlled by the issuer of the display systems, and the relevant root certificate is installed on the central server 404 running the plate service so that it can validate these client certificates. The digital license plate obtains a valid client certificate during the provisioning process from a separate public key infrastructure (PKI) server that is responsible for generating and revoking these client certificates. This PKI server requires that the digital license plate initially present a separate factory client certificate that is installed with the digital license plate software. This factory certificate is only used during provisioning (initialization of a digital display)) to obtain a new client certificate from the PKI server. Without one of these client certificates the digital license plates are unable to communicate with the plate service.

Figure 5:
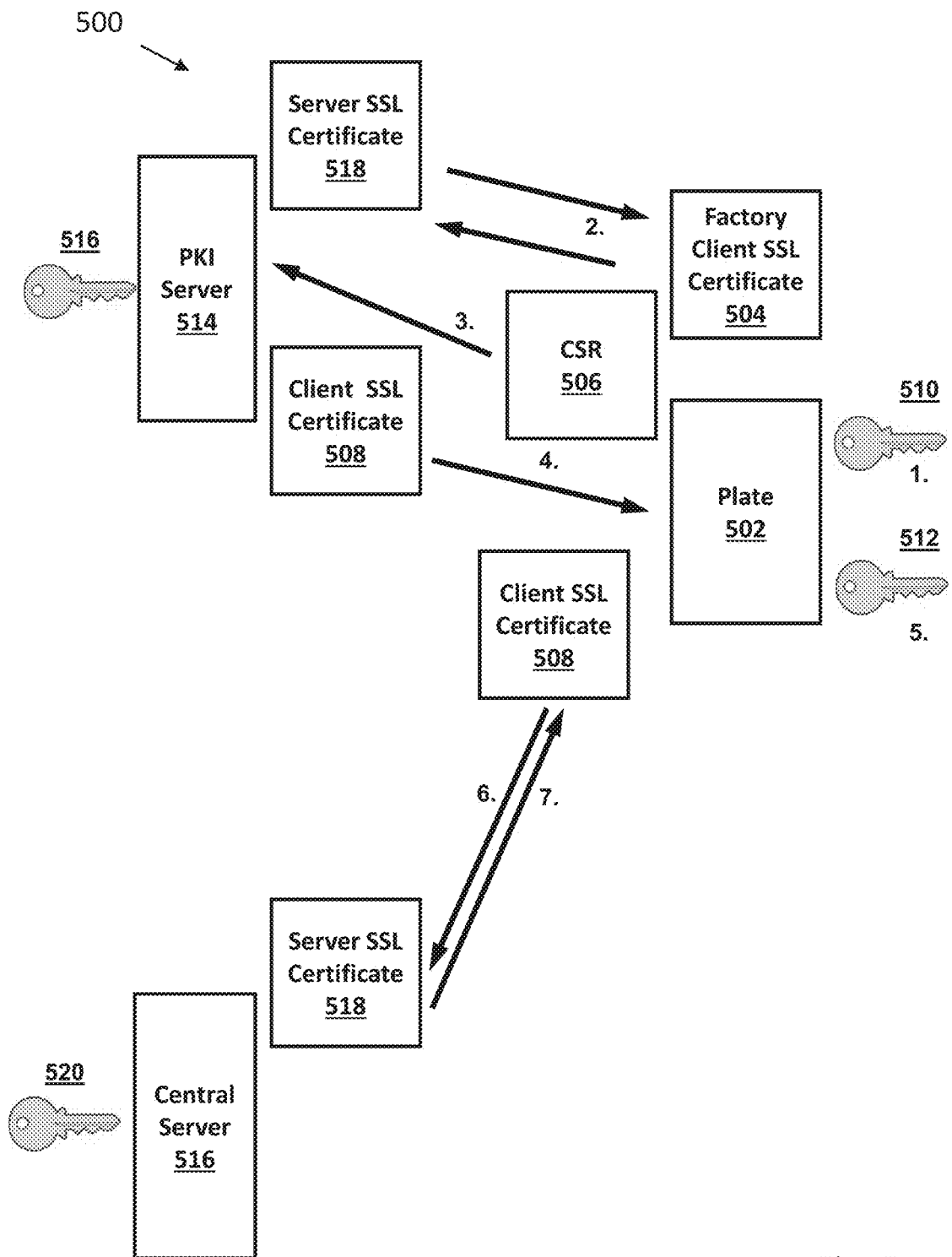
FIG. 5 depicts a method for provisioning, or initializing, a digital license plate system.

FIG. 5 depicts a method 500 for provisioning, or initializing, a display system, also referred to herein as a "plate" or a "digital license plate." A digital license plate (plate) 502 that is unprovisioned will first attempt to provision itself. Referring to FIG. 5, the provisioning process is accomplished in the following steps.

1. The digital license plate 502 generates a private key and a certificate signing request (CSR) 506. The digital license plate 502 generates a private key 512 for this transaction.
2. The digital license plate connects to a PKI server 514 via SSL/TLS. In some embodiments, PKI server 514 may be an NGINX server. During the setup of this secure connection the digital license plate verifies that the SSL certificate presented, referred to as a server SSL certificate 518, by the PKI server 502 is valid. The PKI server 514 asks the digital license plate 502 to provide a client SSL certificate of its own. The digital license plate 1302 sends the PKI server 514 a factory client SSL certificate 504, which is verified as valid by the PKI server 514. If both PKI server 514 and digital license plate 502 are satisfied that the certificates presented by the other entity are valid, then the connection is established and communication can proceed. PKI server 514 may generate its own private key 516 for this transaction.
3. The client sends the CSR 506 generated in step 1 to the PKI server 514 and requests a new client SSL certificate 508.
4. The PKI server 514 verifies the information in the CSR 506 and then generates a new client SSL certificate 508 and sends it to the digital license plate 502 in its response.
5. The digital license plate stores the new client SSL certificate 508 along with the private key 510 generated in step 1. These are then used in all subsequent communications with a central server 516 running the plate service application. The factory client SSL certificate 504 has no further role.
6. The digital license plate 502 now connects with the central server 516 running the plate service application. In some embodiments, central server 516 may be an NGINX server. Again, a SSL/TLS connection is set up, and again there is a two-way verification of credentials where the digital license plate 502 verifies the server SSL certificate 518 against its stored catalogue of valid root certificates, and the central server 516 verifies that the digital license plate 502 is presenting a valid client SSL certificate 508 by checking it against the configured self-signed root certificate. As before, assuming all information is validated, an encrypted connection is established. In some embodiments, central server 516 may generate a private key 520.
7. The digital license plate 502 sends a series of requests to the plate service, presenting its serial number and asking to download a number of assets that are required to fully configure the digital license plate. These include the number plate image, number plate overlay image, and the runtime software. After these are downloaded they are installed in the plate. This ends the provisioning process.

Figure 6:
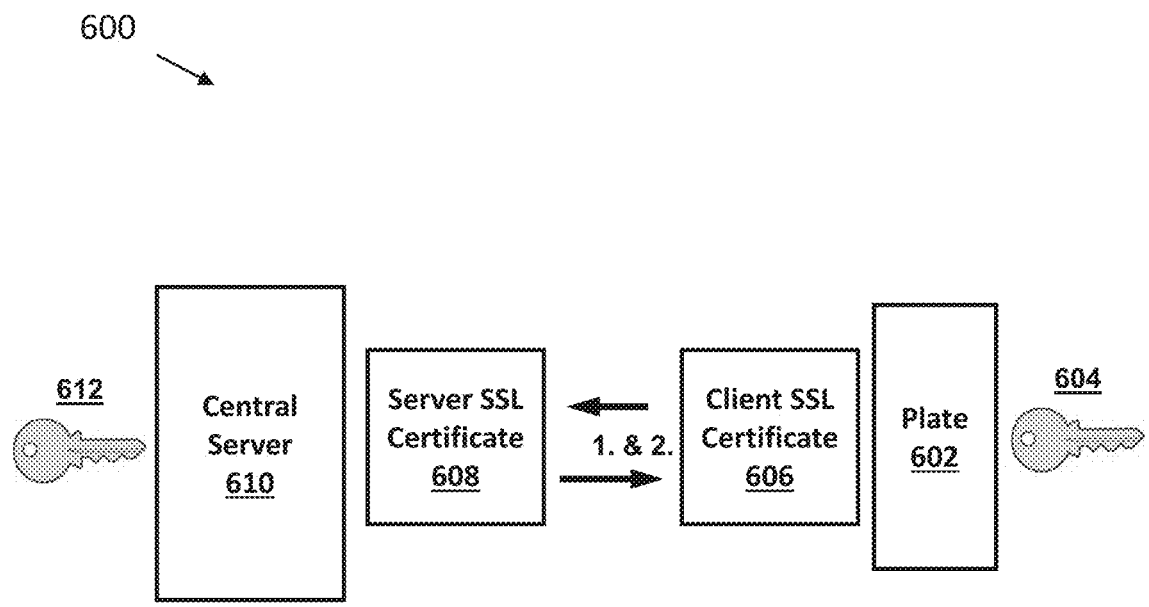
FIG. 6 depicts the interaction between a provisioned digital license plate and a central server.

FIG. 6 depicts the interaction 600 between a digital license plate 602 that is provisioned and a central server 610. In some embodiments, the central server 610 may be identical to central server 516 of FIG. 5. A provisioned digital license plate 602 will regularly contact the central server 610 to either download configuration information and assets, or to upload location information, log files, and other data. Referring to FIG. 6, this interaction consists of the following steps:

Step 1. The digital license plate 602 contacts the central server 604 running the plate service and establishes a SSL/TLS connection. During this connection establishment the central server and plate exchange SSL certificates that include a client SSL certificate 606 and a server SSL certificate 608, and each verify that the other party's certificate is valid (just like was done during the provisioning process). Once security checks are passed, the encrypted SSL/TLS connection is established. Transactions between digital license plate 602 and central server 610 may involve the generation of a client-side private key 604 and a server-side private key 612.

Step 2. With the encrypted connection now established and the identity of both the central server 610 and the digital license plate 602 verified, the digital license plate 602 is free to send its requests to the central server 610—either to download information or to upload data, and the central server 610 responds as appropriate. With each request the digital license plate 602 will send its serial number so that the central server 610 may identify the digital license plate 602 and ensure that each request is handled appropriately. The serial number may also be present in the client SSL certificate that the digital license plate 602 presents to the central server 610, providing an additional method for verifying the identity of the digital license plate 602.

Figure 7:
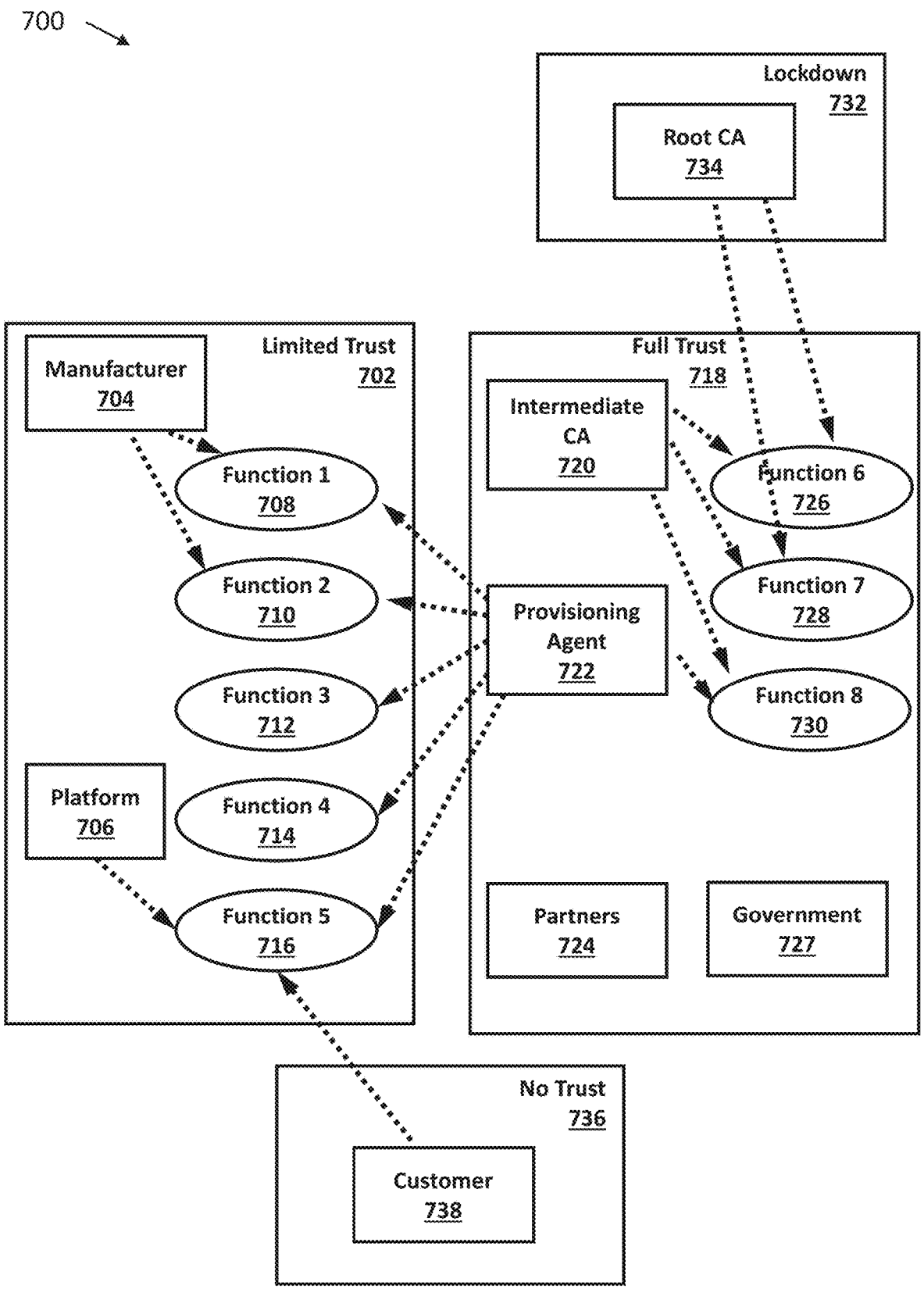
FIG. 7 depicts software security features.

FIG. 7 depicts an embodiment of a software architecture and structure in which different participants are admitted into the security scheme, with each participant having different privileges.

Each of the participants described is assumed to be a separate logical and functional software module. As part of good security policy, each party should be operated as distinct services with no comingling of resources or code libraries. By separating these concerns, the provider of digital license plate and any associated services may build in resilience to failures and security attacks.

Returning to FIG. 7, a root CA 734 is shown, operating with a lockdown capability 732. Root CA 734 is responsible for providing assurance of identity for all sub-modules distributed by the provider of the display systems and associated services. Root CA 734 typically only certifies other CAs, which are called "Intermediate" CAs. By isolating the Root CA, the provider of the display systems and associated services can ensure that compromised modules may be revoked and retired without compromising the integrity or operation of the rest of the infrastructure. Lockdown capability 732 can be used in an emergency to lock down and disable all systems if necessary. It is vital that the private key associated with Root CA 734 remain within a trusted hardware device and that this device shall have no network connectivity whatsoever.

Also shown in FIG. 7 is a full trust group 718. Full trust group 718 includes an intermediate CA 720 (as discussed above), a provisioning agent 722, a partners group 724, and a Government entity group 727. Partners group 724 may include entities that are partners with the provider of the display systems and associated services. Government entity group 727 may include Government agencies such as the DMV. Entities included in full trust 718 have a set of functions that they are allowed to perform, as discussed subsequently. Also defined is a limited trust group 702, where limited trust group 702 may include a manufacturer 704 and a platform 706. Entities included in limited trust group 702 have limited functions that they can perform with regards to the display system ecosystem, as described subsequently. Manufacturer 704 may be an entity responsible for manufacturing one or more components of display system 100, while platform 706 may be responsible for implementing post-provisioning functions on a display system such as display system 100. Also defined is a no trust group 736. A customer 738 is included in no trust group 736, where customer 738 is restricted to performing a very limited set of operations, as discussed below.

Lockdown 732 works by using Root CA 734 to revoke the validity of Intermediate CA 720. Once that is done, the trust within full trust group 718 provided by intermediate CA 720 is also revoked, and so communication between entities in that domain that use credentials validated by intermediate CA 720 no longer work.

In some embodiments, entities may be associated with one or more functions that are performed. These functions, as shown in FIG. 7 are described below:

A function 1 708, where function 1 708 may be associated with issuing a provisioning ticket. This is an X.509 Attribute Certificate (AC) that is signed by the provider of the plate service and acts as a one-time use ticket that allows the bearer to initiate a display system provisioning ceremony. The purpose of this ticket is to ensure that only valid display system devices are allowed to enroll and be issued secure credentials.

A function 2 710, where function 2 710 may be associated with issuing a manufacturing receipt. This is an X.509 Attribute Certificate (AC) that is signed by the provider of the plate service and memorializes a manufacturing event that represents a "Ready for Provisioning" state. This AC is installed on the display system at manufacturing time and may be pre-generated in sequence so that the Manufacturer does not need to participate directly within the PKI associated with the provider of the plate service.

A function 3 712, where function 3 712 may be associated with verifying a provisioning ticket. This is to verify the ticket issued by 710 prior to provisioning, to validate that the plate is ready and OK to provision in the system.

A function 4 714, where function 4 714 may be associated with provisioning a receipt associated with the issuance of a display system such as display system 100. This is an AC that is signed by the provider of the plate service and acts as a receipt of a successful provisioning ceremony. This receipt may be logged and/or stored on the display system in order to provide assurance of provisioning at a later time. The purpose of this receipt is to memorialize an event in time in order to provide non-repudiation in the event of a dispute or proof of authenticity when communicating with a suspected spoofed display system device.

A function 5 716, where function 5 716 may be associated with operating a display system such as display system 100.

A function 6 726, where function 6 726 may be associated with issuing certificates that may include security certificates.

A function 7 728, where function 7 728 may be associated with revoking certificates. This is the ability to revoke a set of credentials, and thus lock a plate or an entity out of the system. So for example, we could revoke the client certificate of a specific plate, which would cause the validation steps described previously above to fail, thus preventing the plate from communicating with the platform.

A function 8 730, where function 8 730 may be associated with issuing and verifying certificates and tokens associated with system security.

In some embodiments, each entity shown in FIG. 7 may be associated with a specific subset of the functions described above, with a non-association between a specific entity and a function possibly implying that the entity is unable to carry, execute or perform the non-associated function. For example, manufacturer 704 may be associated with function 1 708 and function 2 710. Platform 706 may be associated with function 5 716. Customer 738 may be associated with function 5 716. Root CA 734 may be associated with function 6 726 and function 7 728. Intermediate CA 720 may be associated with function 6 726, function 7 728 and function 8 730. Provisioning agent 722 may be associated with function 1 708, function 2 710, function 3 712, function 4 714, function 5 716, and function 8 730. The distinct classification of the functions that each entity is permitted to perform is essential in establishing and maintaining system security.

Figure 8:
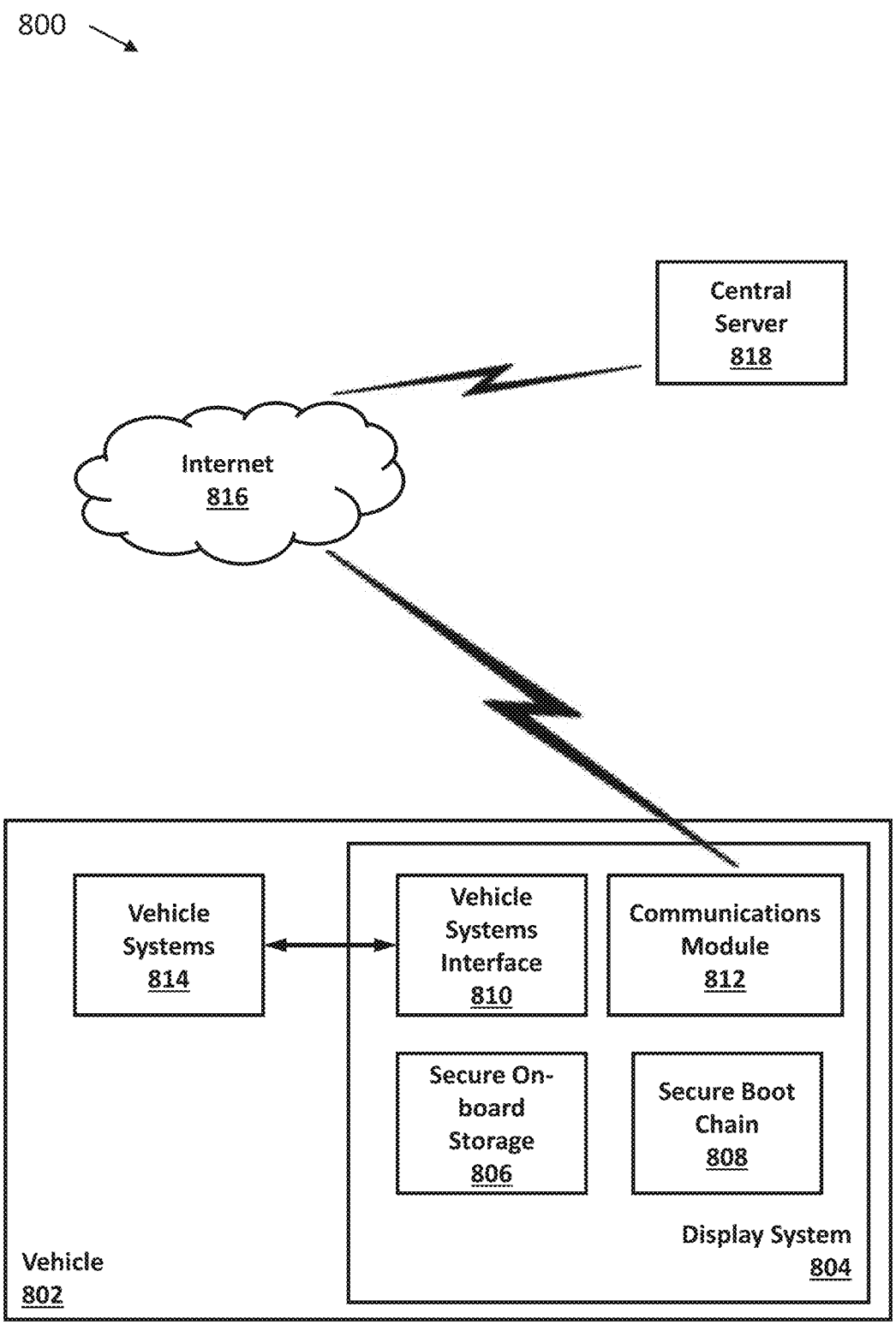
FIG. 8 depicts a security system architecture.

FIG. 8 depicts one embodiment of a security system architecture 800. In some embodiments, a digital license plate 804 is associated with a vehicle 802, where the digital license plate includes various features such as previously discussed. Digital license plate 804 includes a secure on-board storage module, a secure boot chain 808, a vehicle systems interface 810, and a communications module 812. Communications module allows digital license plate 804 to communicate, via the Internet 816, to a central server 818, where central server 818 is physically remote from vehicle 802. The security features incorporated into digital license plate 804 are described below.

Secure Communications: In some embodiments, all communication between digital license plate 804 and central server 818 encrypted using Transport Layer Security (TLS). TLS is used to encrypt all data being transferred between digital license plate 804 and central server 818. Digital license plate 804 is configured to verify a TLS certificate of central server 818 to prevent spoofing attacks such as man-in-the-middle attacks. Digital license plate 804 is associated with and incorporates a unique TLS certificate that includes a unique identifier for digital license plate 804. Thus, a first digital license plate on a first vehicle will have a distinct TLS certificate and associated identifier from a second digital license plate on a second vehicle.

When digital license plate 804 initiates a communication link with central server 818, central server 818 only allows such a communication link to be established if digital license plate 804 has a valid and unexpired TLS certificate. In some embodiments, central server 818 may be configured to compare the unique identifier associated with digital license plate 804 with the identifier included in any data transmitted from digital license plate 804 to central server 818. Subsequent communication is allowed only if there is a match between these two identifiers. This security feature prevents a malicious third party from reusing a certificate associated with one digital license plate on another digital license plate.

Central server 818 also has the authority to revoke a TLS certificate, and this effectively blocks the corresponding digital license plate from communicating with central server 818.

Hardware-Level Security: In some embodiments, digital license plate 804 also includes a secure on-board storage module 806, where secure on-board storage module 806 is configured to store the unique identifier and credentials such as the TLS certificate associated with digital license plate 804. Secure on-board storage module 806 stores any information in an encrypted format, and this prevents unauthorized use or copying of the sensitive stored information.

In other embodiments, digital license plate 804 may also include a secure boot chain module 808. Secure boot chain module 808 is configured such that during the device boot up (i.e. startup) process associated with digital license plate 804, each boot stage is verified by a preceding boot stage before the boot stage is executed. This security feature prevents a malicious third party from replacing the manufacturer software code on digital license plate with their own software code. Furthermore, the manufacturer can verify that the boot image and any application images were digitally signed using the manufacturer's private key.

Application Security: Digital license plate 804 may also include a vehicle systems interface module 810, where vehicle systems interface module 810 is configured to interface with a vehicle systems module 814. Vehicle systems module 814 includes the basic vehicle systems such as the engine control unit (ECU) and so on. In some embodiments, the interface between vehicle systems interface module 810 and vehicle systems module 814 may be via an on-board diagnostics II (OBD-II) interface. Digital license plate 804 may read, via vehicle systems interface module 814, the vehicle identification number (VIN) corresponding to vehicle 802, from vehicle systems module 814. Digital license plate 804 can send the VIN to central server 818, where central server is configured to match the VIN to the unique identifier associated with digital license plate 804. (The correspondence between a VIN and a unique identifier associated with a digital license plate is established during the initialization process for the digital license plate.) This allows central server 818 to verify that the correct digital license plate is mounted on the correct vehicle. If the VIN and unique identifier associated with a digital license plate do not match, central server can take several steps, from setting warning flags to revoking the TLS certificate associated with the digital license plate and disabling the operation of the digital license plate. In certain embodiments, sensor or other data can also be a trigger for mismatch. For example, GPS data can be used to trigger a security warning if the current GPS determined location is outside a preset operational area.

During the initialization process, a digital license plate provides a unique identifier that is stored on central server 818. This ensures that a specific device (digital license plate) is initialized with the correct set of parameters, including relevant display images and assets.

In some embodiments, all images to be displayed on digital license plate 804 are digitally signed by central server 818, and that signature is verified by digital license plate 804. Only images that have been digitally signed by the manufacturer of the plate (also the operator of central server 818) will be displayed on digital license plate 804, and this provides an additional level of security with regards to the data that can be displayed.

Figure 9:
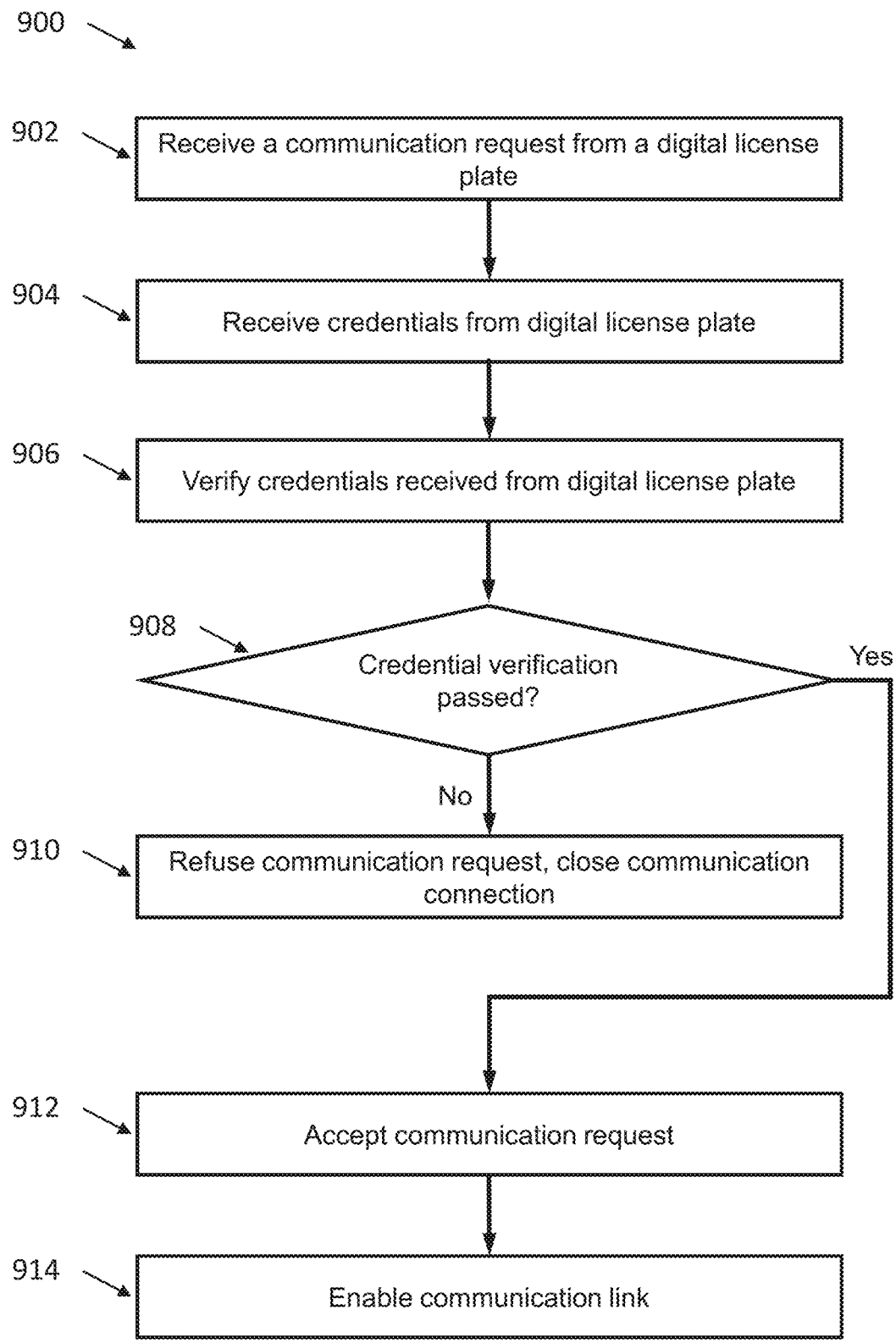
FIG. 9 is a flow diagram depicting a method for secure communications.

FIG. 9 is a flow diagram depicting a method 900 for secure communications. At 902, the method receives a communication request from a digital license plate. In some embodiments, this request may be received by a central server such as central server 818 discussed with respect to FIG. 8. The communication request may be, for example, to initialize a communication link or a request for data transfer. At 904, the method receives credentials from the digital license plate where these credentials may be any combination of a TLS certificate, a digital display unique identifier or any other data that classifies as credentials. At 906, the method verifies the credentials received from the digital license plate, where the verification process may be any combination of the methods described above such as TLS certificate verification (a valid, current, unexpired TLS certificate), a unique identifier associated with the digital license plate, a VIN, and so on. At 908, the method checks to see if the credentials have passed the verification process. If the credentials are not valid and have failed the verification process, the method proceeds to 910, where the communication request is refused, and the communication connection is closed. Various actions can be taken by the digital license plate, including disabling select registration information or providing warning messages. At 908, if the credentials are valid and have passed the verification process, the method proceeds to 912, where the communication request is accepted. At 914, the communication link is enabled.

Figure 10:
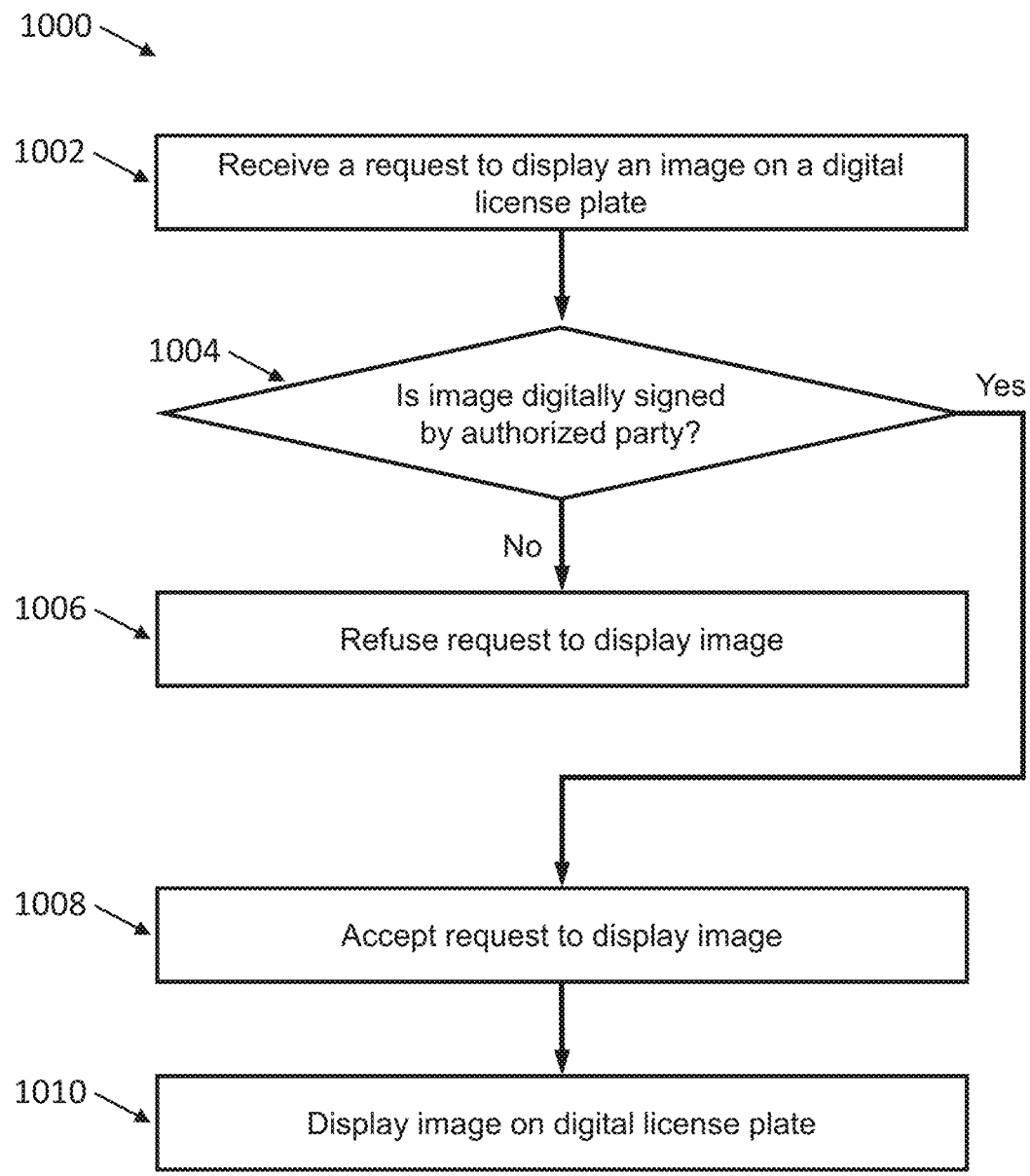
FIG. 10 is a flow diagram depicting a method for verifying a display image.

FIG. 10 is a flow diagram depicting a method 1000 for verifying a display image. At 1002, the method receives a request to display an image on a digital license plate. At 1004, the method checks to see if the image is digitally signed by an authorized party such as the manufacturer of the digital display, as described above. If the image is not digitally signed by an authorized party, the method goes to 1006, where the request to display the image is refused. If, at 1004, the method determines that the image is digitally signed by an authorized party, then the method goes to 1008, where the request to display the image is accepted, and at 1010 the image is displayed on the digital license plate.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

What is claimed is:

1. A method of operating a secure communication system having a server and a digital license plate, comprising the steps of:
    issuing a provisioning ticket to the digital license plate;
    initiating a credential establishment procedure using the provisioning ticket;
    establishing a credential associated with the digital license plate;
    storing the credential at the server;
    receiving, by the server, a communication request from the digital license plate to allow for continued display of a license number, wherein the communication request has an identifier;
    verifying, at the server, whether the credential matches the identifier; and
    refusing, by the server, the communication request if the credential and the identifier do not match, which requires the digital license plate to be unable to display selected information.

2. The method of operating the secure communication system of claim 1, further comprising the step of supporting issuing a manufacturing receipt.

3. The method of operating the secure communication system of claim 1, further comprising the step of supporting verifying a provisioning ticket.

4. The method of operating the secure communication system of claim 1, further comprising the step of supporting provisioning a receipt associated with issuance of a digital license plate.

5. The method of operating the secure communication system of claim 1, further comprising the step of supporting issuing certificates that may include security certificates.

6. The method of operating the secure communication system of claim 1, further comprising the step of supporting revoking certificates.

7. The method of operating the secure communication system of claim 1, further comprising the step of supporting issuance of tokens associated with system security.

8. The method of operating the secure communication system of claim 1, wherein the digital license plate can only display images signed by the server.

9. The method of operating the secure communication system of claim 1, further comprising revoking the credential associated with the digital license plate to prevent the digital license plate from communicating with the server.

10. The method of operating the secure communication system of claim 1, further comprising disabling at least a part of the digital license plate if the identifier does not match the credential.

11. The method of operating the secure communication system of claim 1, further comprising storing the identifier in the digital license plate, wherein the digital license plate include the identifier in any data sent from the digital license plate to the server.

12. The method of operating the secure communication system of claim 1, wherein the secure communication system includes a vehicle system module installed on a vehicle and configured to interface with the digital license plate, the method comprises:
    using the digital license plate to obtain a vehicle identification number associated with the vehicle from the vehicle system module;
    using the digital license plate to include the vehicle identification number in the communication request;
    using the server to verify whether the vehicle identification number and the identifier match the credential; and
    allowing the server to refuse the communication request if one of the vehicle identification number and the identifier do not match the credential.

13. The method of operating the secure communication system of claim 12, further comprising revoking the credential associated with the digital license plate if one of the vehicle identification number and the identifier do not match the credential.

14. The method of operating the secure communication system of claim 12, further comprising disabling at least a part of the digital license plate if one of the vehicle identification number and the identifier do not match the credential.

15. The method of operating the secure communication system of claim 1, comprising:
    saving a license number image associated with the license number at the server;
    digitally sign the license number image using the server;
    sending the license number image, from the server, to the digital license plate;
    verifying, at the digital license plate, whether the license number image includes a signature of the server; and
    displaying the license number image if the license number image is verified to include the signature of the server.

16. A secure communication system, comprising:
    a digital license plate installed on a vehicle; and
    a server having a credential associated with the digital license plate and wirelessly connected to the digital license plate; wherein
    the digital license plate includes an identifier, one or more processors, and a non-transitory computer-readable storage medium storing with one or more programmed instructions which, when executed by one or more processors, cause the processors to perform:
    sending a communication request having the identifier to the server to allow for continued display of a license number;
    the server includes one or more server processors, and a non-transitory computer-readable server storage medium storing with one or more programmed instructions which, when executed by one or more server processors, cause the server processors to perform:
    verifying whether the credential matches the identifier;
    refusing the communication request if the credential and the identifier do not match; and
    requiring the digital license plate to be unable to display selected information; and
    revoking the credential associated with the digital license plate to prevent the digital license plate from communicating with the server.

17. The secure communication system of claim 16, wherein the server includes a warning image, the programmed instructions of the server, when executed by the one or more server processors, causes the server processors to perform sending the warning image to the digital license plate to be display if the credential and the identifier do not match.

18. The secure communication system of claim 16, further comprising:
    a vehicle system module installed on the vehicle and configured to interface with the digital license plate, wherein the vehicle system module has a vehicle identification number associated with the vehicle,
    the programmed instructions of the digital license plate which, when executed by one or more processors, cause the processors of the digital license plate to perform obtaining and including the vehicle identification number in the communication request,
    the programmed instructions of the server, when executed by one or more server processors, cause the server processors to perform:
    verifying whether the vehicle identification number and the identifier matches the credential; and
    refusing communication request if one of the vehicle identification number and the identifier does not match the credential.

19. The secure communication system of claim 16, wherein the server includes a license number image associated with a license number of the vehicle,
    the programmed instructions of the server, when executed by one or more server processors, cause the server processors to perform digitally signing and sending the license number image to the digital license plate to be displayed,
    the programmed instructions of the digital license plate which, when executed by one or more processors, cause the processors of the digital license plate to perform:
    verifying whether the license number image includes a signature of the server; and
    displaying the license number image if the license number image is verified to include the signature of the server.

20. A method of operating a secure communication system having a server and a digital license plate, comprising the steps of:
    establishing a credential associated with the digital license plate;
    configuring the digital license plate to only display images signed by the server;
    storing the credential at the server;
    receiving, by the server, a communication request from the digital license plate to allow for continued display of a license number, wherein the communication request has an identifier;
    verifying, at the server, whether the credential matches the identifier; and
    refusing, by the server, the communication request if the credential and the identifier do not match, which requires the digital license plate to be unable to display selected information.

* * * * *